Patented Dec. 12, 1922.

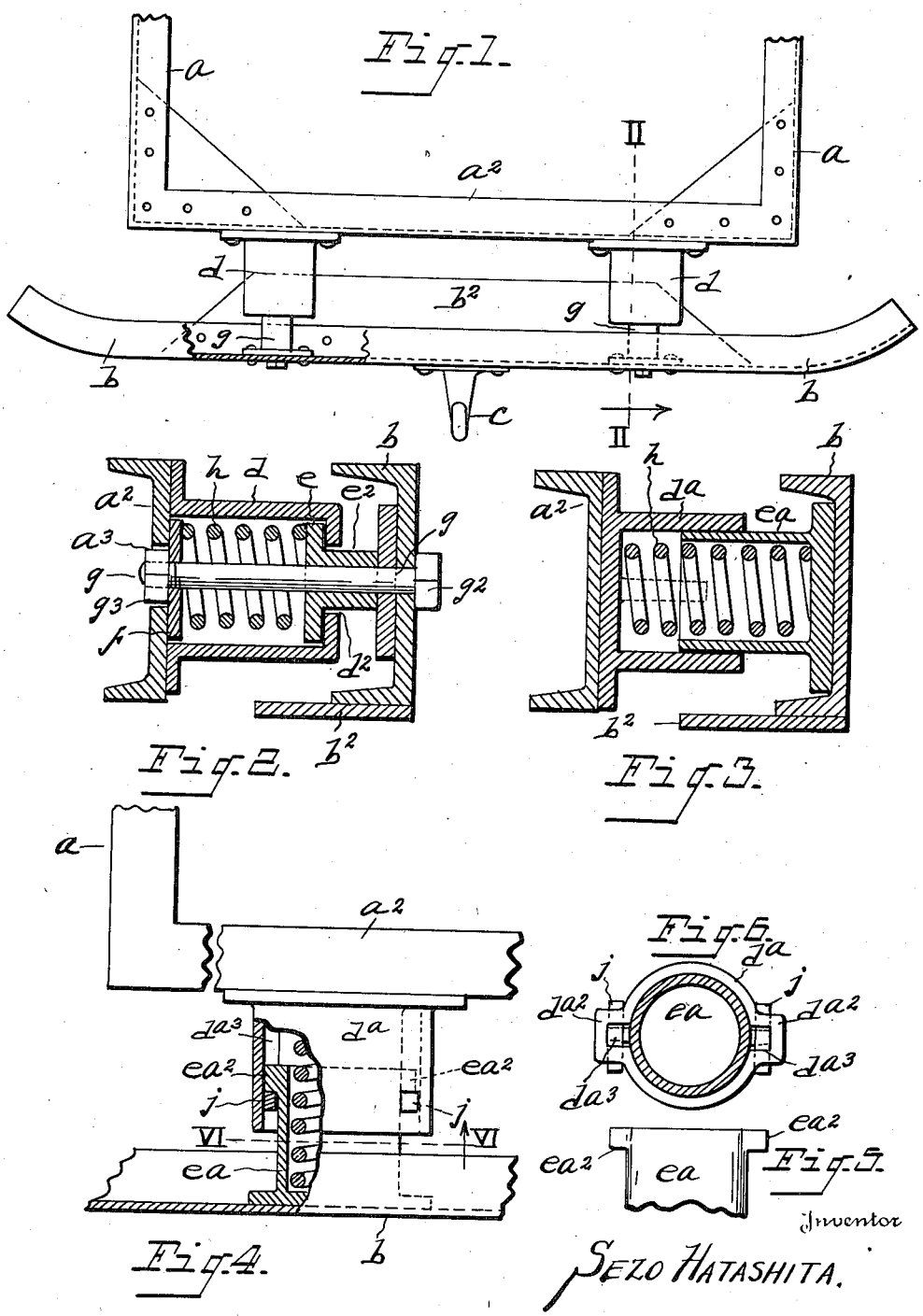

1,438,177

UNITED STATES PATENT OFFICE.

SEZO HATASHITA, OF DETROIT, MICHIGAN.

AUTOMOBILE FENDER.

Application filed January 31, 1920. Serial No. 355,508.

*To all whom it may concern:*

Be it known that I, SEZO HATASHITA, a subject of the Emperor of Japan, residing at Detroit, county of Wayne, State of Michigan, have invented a certain new and useful Improvement in Automobile Fenders, and declare the following to be a full, clear, and exact description of the same, such as will enable others skilled in the art to which it pertains to make and use the same, reference being had to the accompanying drawings, which form a part of this specification.

My invention relates to fenders for automobiles and a special object of my improvements is to provide an improved fender in which the movable joints are enclosed and protected, and, in one form, adapted to oppose a suitable resilient resistance to a sudden force applied to it in either direction.

In the accompanying drawing,—

Figure 1 is a plan view of an apparatus embodying my invention and so much of an automobile as is necessary to show its connection therewith.

Fig. 2 is a detail sectional view on the line II—II of Fig. 1.

Fig. 3 is a view similar to Fig. 2 showing a modified construction.

Fig. 4 is a detail plan view partly broken away to further illustrate the modification of Fig. 3.

Fig. 5 is a detail plan view showing the inner end of the piston or plunger of the modification shown in Fig. 3.

Fig. 6 is a detail sectional view, the section being taken on the line VI—VI, Fig. 4.

I have particularly designed the construction shown in the accompanying drawing for use with an automobile truck or commercial vehicle, though obviously my invention is not confined to this kind of automobile.

$a$ is the front part of the frame or chassis of an automobile; $a^2$ is the front cross-piece.

$b$ is a transverse bar bent backward at the ends and forming a conventional form of contact bar in the fender. The cross-section of this bar is that of a channel iron, the web being vertical and the flanges extending horizontally inward. A strengthening plate $b^2$ is provided intermediate the ends of the bar $b$.

$c$ (Fig. 1) is a hook or other form of attachment secured to the bar $b$ at its center and outer surface. This is a conventional attaching means for the tractor when the apparatus is used as a trailer.

$d$, $d$ are cylindrical socket pieces secured to the cross piece $a^2$ at the outer portion and near the ends thereof. $d^2$ (Fig. 2) indicates a co-axial aperture formed in the outer end of each of the socket pieces $d$.

$e$ is a circular piston-like disk adapted to fit loosely in the socket piece $d$ and reciprocate therein. The disk $e$ has a co-axial cylindrical projection extending outward therefrom thru the aperture $d^2$ and adapted to reciprocate in said aperture.

$f$ is a plate engaging with a flat surface against the outer surface of the cross-bar $a^2$ of the frame $a$ within each of the socket pieces $d$. The plate $f$ has a cylindrical co-axial aperture formed thru it. $h$ is a compression spring engaging between the disks $e$ and $f$ and acting against said disks. $g$ is a bolt secured to the bar $b$ extending thru coaxial apertures in the disks $e$ and $f$ and engaging by its head $g^2$ the bar $b$ and by the nut $g^3$ against the inner surface of the plate $f$. An aperture $a^3$ is formed thru the web of the cross-piece $a^2$ to permit of the passage of the nut $g^3$.

The operation of the device described above is as follows:

If the bar $b$ comes in contact with an obstruction, it is forced inward against the resilience of the springs $h$ in the sockets $d$, $d$. The disk $e$, being pressed inward against the resistance of the contiguous spring $h$, if a sudden pull is exerted upon the attaching part $c$, this is resisted by the spring $h$, the force being conveyed thru the bolts $g$, $g$ to the plates $f$ and the forward movement of these plates being resiliently resisted by the spring $h$. In this way a sudden force exerted on the bar $b$ transversely thereof in either direction is resiliently resisted and by the same spring.

In the modifications of Figs. 3 to 6 inclusive, instead of the disk $e$ and cylindrical projections $e^2$ there is provided a cylinder $ea$ fastened at one end to the bar $b$ and adapted to reciprocate in the socket piece $da$ corresponding to the socket piece $d$, except that the outer end is entirely open. The plunger $ea$ is hollow and the spring $h$ is interposed between its outer end wall and the inner wall of the socket piece $da$.

The socket piece $da$ has lateral ridges $da^2$ in which are formed ways $da^3$ extending longitudinally thereof and laterally from the bore of said socket piece. $ea^2$ are lugs extending laterally from the inner end of the plunger $ea$. These lugs extend into the grooves $da^3$. $j\ j$ are pins extending vertically thru the walls of the ridges $da^2$ and thru the grooves $da^3$. The lugs $ea^2$ engage inside of the pins $j\ j$ and said pins prevent the plunger $ea^2$ from being accidentally withdrawn from the socket piece $da$.

In both of the constructions above described, the springs $h$ are enclosed in casings and are protected from dirt and accumulation of foreign matter thereon. The engaging surfaces are mainly interior and consequently are more permanent.

What I claim is:

1. The combination of a chassis, a spring fixed to said chassis in a horizontal plane in the line of motion of the chassis, a lug on said chassis engaging against each end of said spring to prevent an outward but permitting an inward movement of said end, an automobile fender and means attached to said fender engaging against each end of said spring so as to permit a relative outward movement of the engaging end at each end but to restrain a relative movement of said engaging means and said spring at each end.

2. The combination of a chassis, sockets with enclosing walls extending outward from the end of said chassis, springs secured within said sockets, an automobile fender contact bar, and plungers secured to said bar engaging in said sockets and adapted to reciprocate therein, said springs forming a resilient resistance to the motion of said plungers, and means engaging said fender bar and the opposite end of said spring to that engaged by said plunger adapted to reciprocate in said socket piece against the resilient resistance of the spring therein.

3. In an apparatus of the kind described, the combination of a chassis, sockets having enclosing walls extending outward from said chassis, springs secured in said sockets, an automobile fender contact bar, a plunger secured to said contact bar, resting against the outer end of said spring and being adapted to move inward against the action of said spring in said socket piece, a disk engaging the opposite end of said spring adapted to move outward in said piece against the action of said spring, and a bolt securing said disk to said fender bar so as to permit a relative inward movement of said bolt.

4. In an apparatus of the kind described, the combination of a chassis, sockets having enclosing walls extending outward from said chassis, springs in said sockets, an automobile fender contact bar, plungers secured to said contact bar resting against the outer ends of said springs and being adapted to reciprocate in said socket pieces, a disk engaging the opposite ends of said springs, and a bolt engaging the inner surface of said disk and said fender bar, said chassis being provided with an aperture to permit the passage of said bolt therethru, as shown and described.

5. The combination of an automobile fender contact bar, a chassis, an attaching means securing said bar to said chassis, said means consisting in part of a resilient portion, means securing said attaching means to said chassis through the resilient portion thereof so that the movement of said bar relative to said chassis shall be elastically resisted in both directions by said resilient means.

6. The combination of an automobile fender contact bar, a chassis, a helical spring, means fixed to said chassis engaging each end of said spring to restrain an outward movement thereof, attaching means on said bar engaging one end of said spring so as to have a free outward movement but to compress said spring in its relative inward movement and an attaching means on said bar engaging the other end of said spring so as to have a free outward movement but to compress said spring in its relative inward movement.

In testimony whereof, I sign this specification.

SEZO HATASHITA.